(12) United States Patent
Lai et al.

(10) Patent No.: US 11,068,189 B2
(45) Date of Patent: Jul. 20, 2021

(54) STORAGE DEVICE AND CONTROL METHOD THEREOF

(71) Applicant: SK hynix Inc., Gyeonggi-do (KR)

(72) Inventors: Ching-Chung Lai, Hsinchu County (TW); Lian-Chun Lee, Hsinchu County (TW); Chun-Shu Chen, Hsinchu County (TW)

(73) Assignee: SK hynix Inc., Gyeonggi-do (KR)

( * ) Notice: Subject to any disclaimer, the term of this patent is extended or adjusted under 35 U.S.C. 154(b) by 115 days.

(21) Appl. No.: 16/674,893

(22) Filed: Nov. 5, 2019

(65) Prior Publication Data

US 2020/0326874 A1    Oct. 15, 2020

(30) Foreign Application Priority Data

Apr. 9, 2019    (TW) .................................. 108112380

(51) Int. Cl.
*G06F 12/00* (2006.01)
*G06F 3/06* (2006.01)
*G06F 12/02* (2006.01)

(52) U.S. Cl.
CPC ............ *G06F 3/0647* (2013.01); *G06F 3/061* (2013.01); *G06F 3/0604* (2013.01); *G06F 3/0631* (2013.01); *G06F 3/0644* (2013.01); *G06F 3/0659* (2013.01); *G06F 3/0673* (2013.01); *G06F 3/0679* (2013.01); *G06F 12/0238* (2013.01); *G06F 12/0246* (2013.01); (Continued)

(58) Field of Classification Search
CPC .... G06F 3/0647; G06F 3/0604; G06F 3/0631; G06F 3/0644; G06F 3/0659; G06F 3/0673; G06F 3/061; G06F 3/064; G06F 3/0679; G06F 12/0238; G06F 12/0246; G06F 12/0253; G06F 2212/7211; G06F 2212/7205

See application file for complete search history.

(56) References Cited

U.S. PATENT DOCUMENTS 10,126,981 B1 * 11/2018 Malina .................. G06F 3/0616
2007/0294490 A1 * 12/2007 Freitas ................ G06F 13/1668
                                                              711/154

(Continued)

FOREIGN PATENT DOCUMENTS

KR         101867282       6/2018
KR       1020180064198     6/2018

*Primary Examiner* — John A Lane
(74) *Attorney, Agent, or Firm* — IP & T Group LLP (57) ABSTRACT

A control method of a storage device may include the steps of determining, by a storage device controller of the storage device, whether the storage device has to move internal data; deciding, by the storage device controller, a data movement allocation ratio based on at least some of internal data movement requests and the number of free pages in the storage device, when it is determined that the storage device has to move internal data; and allocating, by the storage device controller, one or more programming times to complete a first data number of internal data movement operations corresponding to at least some of the internal data movement requests and a second data number of host data write operations, such that the ratio of the first and second data numbers coincides with the data movement allocation ratio.

18 Claims, 7 Drawing Sheets

(52) U.S. Cl.
CPC .. *G06F 12/0253* (2013.01); *G06F 2212/7205* (2013.01); *G06F 2212/7211* (2013.01)

(56) References Cited

U.S. PATENT DOCUMENTS

| | | | |
|---|---|---|---|
| 2015/0169237 A1* | 6/2015 | Ioannou | G06F 3/0616 711/103 |
| 2017/0075805 A1* | 3/2017 | Ouyang | G06F 12/0246 |
| 2017/0262216 A1* | 9/2017 | Polkovnikov | G06F 3/067 |
| 2017/0351602 A1* | 12/2017 | Oshimi | G11C 11/5628 |
| 2019/0163622 A1* | 5/2019 | Wu | G06F 12/0253 |
| 2019/0278490 A1* | 9/2019 | Muchherla | G06F 3/0616 |

\* cited by examiner

STORAGE DEVICE AND CONTROL METHOD THEREOF

CROSS-REFERENCES TO RELATED APPLICATION

The present application claims priority under 35 U.S.C. § 119(a) to Taiwan application number 108112380, filed on Apr. 9, 2019, which is incorporated herein by reference in its entirety.

BACKGROUND

1. Technical Field

Various embodiments generally relate to an electronic device, and more particularly, to a storage device and a control method thereof.

2. Related Art

Since a nonvolatile storage device retains data stored therein even after power-off and has a small volume and low power consumption, the nonvolatile memory device, for example, a flash memory-based storage device, is widely used in electronic devices. Furthermore, nonvolatile storage devices such as a solid-state drive (SSD) have also been mounted in desktop computers, notebook computers and server-type computer systems.

When an electronic device executes an application program to store various data such as a text, data, a photograph, audio or video, the electronic device often needs to provide a number of data write requests to the storage device within a short time. A controller of the storage device may generate write commands according to the write requests of the electronic device (i.e. a host), and execute the generated write commands. The controller of the storage device may store the write commands of the host using a command queue. The write commands of the host, stored in the command queue, may be sequentially outputted to a memory of the storage device to perform data write operations. In some cases, the storage device is required to move internal data. When the storage device performs an operation of moving internal data, the operation may have an influence on the execution efficiency of the write command from the electronic device, thereby degrading and destabilizing the write performance for the electronic device. In this case, the degradation and destabilization of the write performance may be reflected in the smoothness of a response of the application program or the service efficiency of the application program.

SUMMARY

Various embodiments are directed to a storage device which is applied to a device with a memory, methods capable of stabilizing data write efficiency of a host when performing an internal data movement operation, a control method thereof, and a storage medium.

In an embodiment, a control method of a storage device may include the steps of: determining, by a storage device controller, whether the storage device has to move internal data; deciding, by the storage device controller, a data movement allocation ratio based on at least some of internal data movement requests and the number of free pages in the storage device, when it is determined that the storage device has to move internal data; and allocating, by the storage device controller, one or more programming times to complete a first number of internal data movement operations corresponding to the at least some of the internal data movement requests and a second number of host data write operations, such that the ratio of the first number to the second number coincides with the data movement allocation ratio, wherein the first number is greater than the second number.

The storage device controller may have a data movement request sequence for storing the internal data movement requests, each of the internal data movement requests may correspond to a memory region whose internal data are to be moved in the storage device, and the memory region whose internal data are to be moved may be a memory region where garbage collection, wear-levelling, block reclaim or runtime bad block is to be performed.

The storage device controller may have a data movement request sequence (stream) for storing the internal data movement requests, and each of the internal data movement requests may correspond to a memory region whose internal data are to be moved in the storage device. When it is determined in the step (b) that the storage device has to move the internal data, the storage device controller may decide the data movement allocation ratio based on at least some of the internal data movement requests in the data movement request sequence, the number of required free blocks and the number of free pages.

The data movement allocation ratio may be decided based on at least some internal data movement requests with relatively high priorities in the data movement request sequence, the number of required free blocks and the number of free pages.

The storage device controller may have a data movement request sequence for storing the internal data movement requests, and each of the internal data movement requests may correspond to a memory region whose internal data are to be moved in the storage device. The step (b) may include the steps of: deciding, by the storage device controller, a total number of pages whose data are to be moved, based on at least some internal data movement requests with relatively high priorities among the internal data movement requests in the data movement request sequence, and the number of required free blocks, when it is determined that the storage device has to move internal data; and decoding the data movement allocation ratio based on the total number of pages whose data are to be moved and the number of free pages.

The storage device may include a plurality of memory chips. The step (c) may include the step of allocating, by the storage device controller, the one or more programming times to complete the first data number of internal data movement operations using a first number of memory chips in the storage device and to complete the second data number of host data write operations using a second number of memory chips in the storage device, according to a parallel mode, such that the ratio of the first and second data numbers and the ratio of the first number of memory chips and the second number of memory chips coincide with the data movement allocation ratio, wherein the first data number is larger than the second data number, and the first number of memory chips is larger than the second number of memory chips.

The one or more programming times may include a first number of programming times and a second number of programming times. The step (c) may include the step of allocating, by the storage device controller, the first number of programming times to complete the first data number of internal data movement operations, and allocating the second number of programming times to complete the second data number of host data write operations, such that the ratio of the first and second data numbers coincides with the data movement allocation ratio, wherein the first data number is larger than the second data number, and the first number of programming times is larger than the second number of programming times.

The storage device may include a plurality of memory chips. The step (c) may include the steps of: deciding, by the storage device controller, an operation mode for the internal data movement operation and the host data write operation, wherein the operation mode is one of a parallel mode and a non-parallel mode; and allocating the one or more programming times to complete the first data number of internal data movement operations and the second data number of host data write operations in the operation mode, such that the ratio of the first and second data numbers coincides with the data movement allocation ratio, wherein the first data number is larger than the second data number.

In an embodiment, there is provided a non-transitory computer-readable storage medium that stores program code for controlling a storage device, the program code which when executed by a processor, causes the storage device to perform operations comprising: determining, by a storage device controller, whether the storage device has to move internal data; deciding, by the storage device controller, a data movement allocation ratio based on at least some of internal data movement requests and the number of free pages in the storage device, when it is determined that the storage device has to move internal data; and allocating, by the storage device controller, one or more programming times to complete a first number of internal data movement operations corresponding to the at least some of the internal data movement requests and a second number of host data write operations, such that the ratio of the first number to the second number coincides with the data movement allocation ratio, wherein the first number is greater than the second number.

In an embodiment, a storage device may include: a memory; and a storage device controller coupled to the memory, and configured to control the memory to perform data access to the memory, wherein the storage device controller determines whether the storage device has to move internal data; decides a data movement allocation ratio based on at least some of internal data movement requests and the number of free pages in the storage device, when it is determined that the storage device has to move internal data; and allocates one or more programming times to complete a first number of internal data movement operations corresponding to at least some of the internal data movement requests and a second number of host data write operations, such that the ratio of the first number to the second number coincides with the data movement allocation ratio, wherein the first number is greater than the second number.

The storage device controller may have a data movement request sequence for storing the internal data movement requests, each of the internal data movement requests may correspond to a memory region whose internal data are to be moved in the storage device, and the memory region whose internal data are to be moved may be a memory region where garbage collection, wear-levelling, block reclaim or runtime bad block is to be performed.

The storage device controller may have a data movement request sequence for storing the internal data movement requests, and each of the internal data movement requests may correspond to a memory region whose internal data are to be moved in the storage device. When determining that the storage device has to move internal data, the storage device controller may decide the data movement allocation ratio based on at least some of the internal data movement requests in the data movement request sequence, the number of required free blocks and the number of free pages.

The storage device controller may decide the data movement allocation ratio based on at least some internal data movement requests with relatively high priorities in the data movement request sequence, the number of required free blocks and the number of free pages.

The storage device controller may have a data movement request sequence for storing the internal data movement requests, and each of the internal data movement requests may correspond to a memory region whose internal data are to be moved in the storage device. When determining that the storage device has to move internal data, the storage device controller may decide a total number of pages whose data are to be moved, based on at least some internal data movement requests with relatively high priorities among the internal data movement requests in the data movement request sequence and the number of required free blocks, and decide the data movement allocation ratio based on the total number of pages whose data are to be moved and the number of free pages.

The memory may include a plurality of memory chips, and the storage device controller may allocate the one or more programming times to complete the first data number of internal data movement operations using a first number of memory chips in the storage device and to complete the second data number of host data write operations using a second number of memory chips in the storage device, according to a parallel mode, such that the ratio of the first and second data numbers and the ratio of the first number of memory chips and the second number of memory chips coincide with the data movement allocation ratio, wherein the first data number is larger than the second data number, and the first number of memory chips is larger than the second number of memory chips.

The one or more programming times may include a first number of programming times and a second number of programming times, and the storage device controller may allocate the first number of programming times to complete the first data number of internal data movement operations, and allocate the second number of programming times to complete the second data number of host data write operations, such that the ratio of the first and second data numbers coincides with the data movement allocation ratio, wherein the first data number is larger than the second data number, and the first number of programming times is larger than the second number of programming times.

The memory may include a plurality of memory chips, and the storage device controller may decide an operation mode for the internal data movement operation and the host data write operation, which is a parallel mode or a non-parallel mode, and allocate the one or more programming times to complete the first data number of internal data movement operations and the second data number of host data write operations according to the operation mode, such that the ratio of the first and second data numbers coincides with the data movement allocation ratio, wherein the first data number is larger than the second data number.

In an embodiment, a storage device may include: a memory including a plurality of blocks, each block including a plurality of pages; and a controller coupled to the memory, suitable for: determining the number of data moves based on the number of target pages whose data are to be moved between at least two blocks among the plurality of blocks and the number of free pages for write data from a host; determining a programming time for the write data and data movement times for data moves based on the number of data moves; and performing a data movement for the number of target pages based on the data movement times.

These and other features and advantages of the present invention will become apparent to those skilled in the art of the invention from the following detailed description in conjunction with the following drawings.

DETAILED DESCRIPTION

For understanding the purpose, features and effects of the present disclosure, the present disclosure will be described in detail through various embodiments with reference to the accompanying drawings.

Although various embodiments of the present invention will be shown and described, it will be appreciated by those of ordinary skill in the art that changes may be made in these embodiments without departing from the principles and spirit of the present invention.

It should be understood that the drawings are simplified schematic illustrations of the described devices and may not include well known details for avoiding obscuring the features of the invention.

It should also be noted that features present in one embodiment may be used with one or more features of another embodiment without departing from the scope of the invention.

Figure 1:
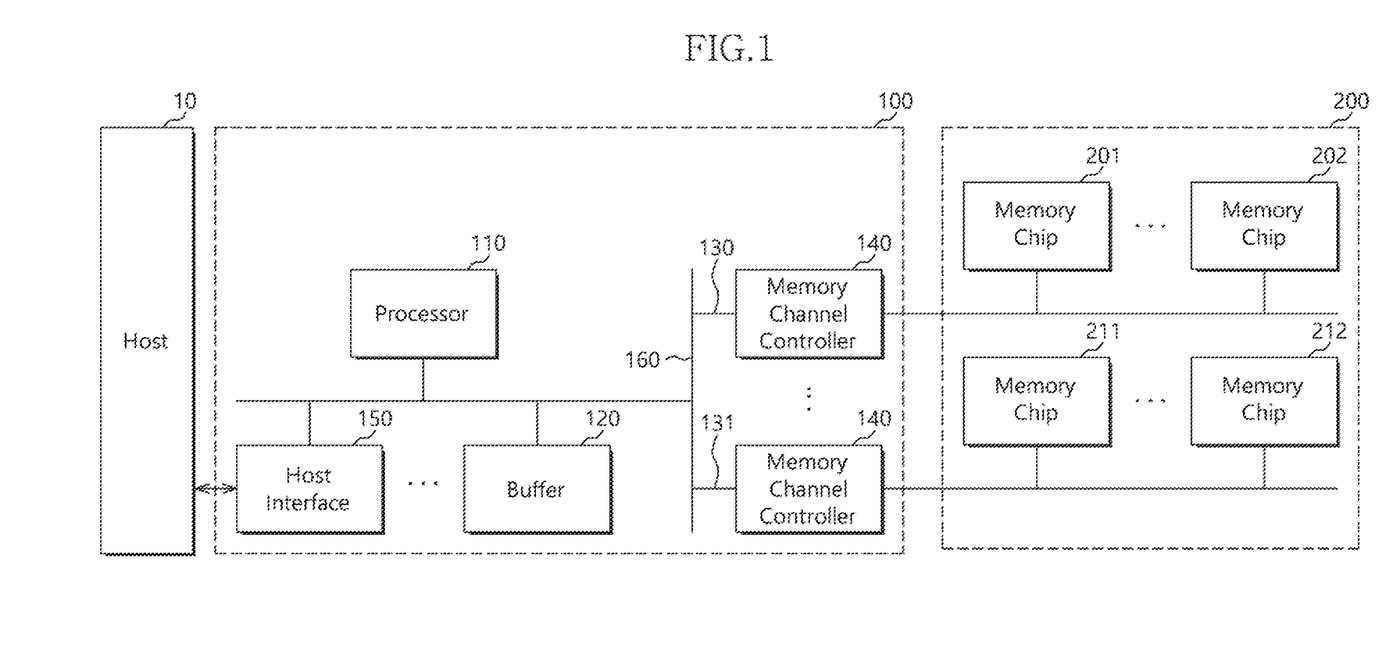
FIG. 1 is a block diagram illustrating a storage device in accordance with an embodiment of the present invention.

FIG. 1 illustrates a storage device in accordance with an embodiment of the present disclosure. The storage device of FIG. 1 may implement a control method of FIG. 3, 5 or 7, which will be described below in detail, and implement various methods capable of stabilizing data write efficiency of a host when the storage device needs to perform an operation of moving internal data. For example, the storage device may allocate one or more programming times to complete internal data movement operations and host data write operations, and control the count ratio of the internal data movement operations and the host data write operations. Thus, when the storage device performs an operation of moving internal data, the influence on the destabilization of host data write efficiency may be reduced. As illustrated in FIG. 1, the storage device includes a storage device controller 100 and a memory 200. The storage device controller 100 includes a processor 110, a buffer 120, a plurality of memory channels (for example, 130 and 131), and a memory channel controller 140 corresponding to each of the memory channels. The buffer 120 may be implemented with a volatile memory or nonvolatile memory. The memory 200 includes a plurality of memory chips (for example, 201, 202, 211 and 212). For example, the memory chip is a flash memory such as a NOR-type memory or NAND-type memory, but the present embodiment is not limited thereto.

The storage device controller 100 may receive a read or write request from a host 10 by communicating with the host 10 through a host interface 150. The storage device controller 100 generates a read command or write command corresponding to the read request or write request of the host 100. Further, the storage device controller 100 transfers the generated command to the memory channel controller 140 of the memory channel (for example, 130 or 131) corresponding to the command. The memory channel controller 140 serves to control one or more memory chips. For example, the memory channel controller 140 transfers a data read command to any one memory chip, and transfers data, which is read according to the data read command, to the storage device controller 100, for example, the buffer 120. The storage device controller 100 transfers data requested by the host 10 to the host 10. Furthermore, the memory channel controller 140 stores data, which is to be written according to the data write command, into a memory chip. When the storage device controller 100 controls an operation of the memory 200, the buffer 120 may be used by the storage device controller 100 and the memory 200, and store data for various operations such as a read operation, a write operation, a program operation and an erase operation. In FIG. 1, the plurality of memory channel controllers 140 perform read or write operations according to a parallel processing mode. In addition, the processor 110 is electrically coupled to the memory channels (for example, 130 and 131) through a bus 160. However, the present disclosure is not limited to the above-described examples. For example, each of the memory channel controllers may be implemented with a logic circuit or programmable circuit, or implemented in software and executed by the processor 110. For another example, the storage device controller 100 may be implemented as a memory channel controller 140 having only one memory channel.

The host interface 150 may process a command and data provided from the host 10, and communicate with the host 10 through one or more of various interface protocols such as universal serial bus (USB), multi-media card (MMC), peripheral component interconnection (PCI)-Express (PCI-e or PCIe), small computer system interface (SCSI), serial advanced technology attachment (SATA), parallel advanced technology attachment (PATA), serial attached SCSI (SAS), enhanced small disk interface (ESDI) and integrated drive electronics (IDE).

Figure 2:
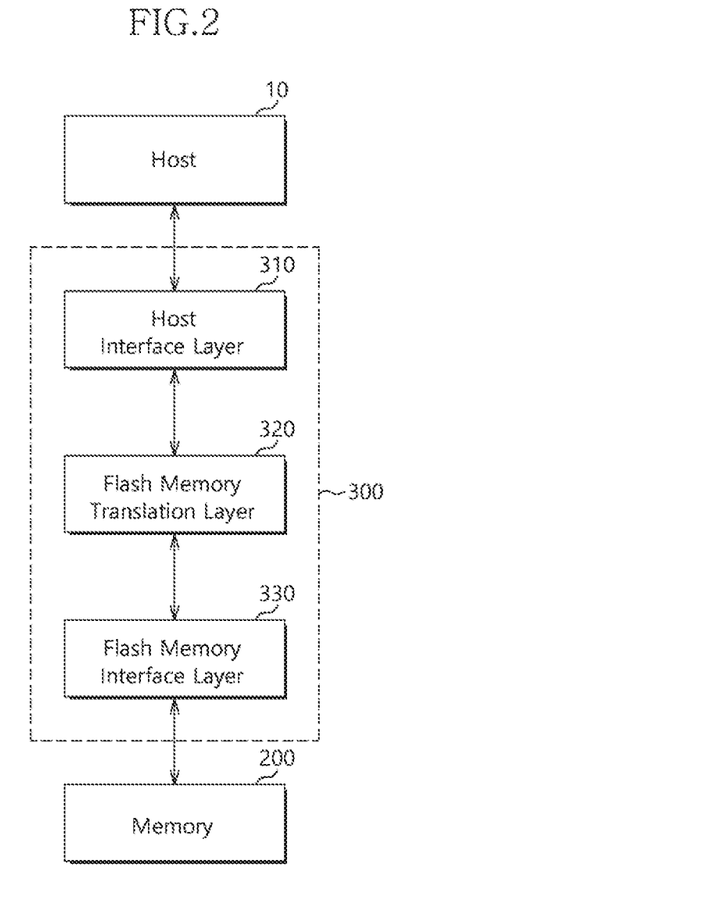
FIG. 2 is a block diagram illustrating a storage device controller in accordance with an embodiment of the present invention.

FIG. 2 is a block diagram illustrating a storage device controller 300 in accordance with an embodiment of the present invention. FIG. 2 illustrates a structure of the storage device controller 300 implemented in firmware or software. For example, the storage device controller 300 includes a host interface layer 310, a flash memory translation layer 320, and a flash memory interface layer 330. The host interface layer 310 for communication with the host 10 serves as an interface between the host 10 and the storage device controller 300. The flash memory translation layer 320 serves to manage read, write, and erase operations. The flash memory translation layer 320 also serves to translate a logical address (for example, a logical block address or logical page address) into a physical address (for example, a physical block address or physical page address) corresponding to the memory chip 201, 202, 211 or 212 of the memory 200. The flash memory interface layer 330 serves to process communication between the flash memory translation layer 320 and the memory 200. For example, the flash memory interface layer 330 transfers a command from the flash memory translation layer 320 to the memory 200.

The storage device controller 300 may be implemented through the hardware structure of FIG. 1. The flash memory translation layer 320 refers to and protects an address mapping table when translating a logical address into a physical address. Since the address mapping table includes a large amount of data, the flash memory translation layer 320 stores some sections of the address mapping table in a cache. When the corresponding relationship between a logical address and a physical address, which is required for translation, is not stored in the cache, the flash memory translation layer 320 generates a mapping table read command by updating the contents of the section of the address mapping table in the cache. Furthermore, when the address mapping table is applied to a memory product such as an embedded MMC (eMMC) or other memory products, the address mapping table is stored in a memory of the memory product. However, the present disclosure is not limited to such an example.

The storage device controller 300 controls various operations on the memory 200, for example, a write operation, a read operation, a program operation, and an erase operation. For example, the storage device controller 300 may generate a write command according to a write request of the host 10, and execute the generated write command. The storage device controller 300 may store write commands of the host 10 using a command queue. The storage device controller 300 may perform a data write operation by sequentially processing the write commands of the host 10, stored in the command queue.

In particular, the storage device controller 300 controls a firmware algorithm applied to the flash memory translation layer 320. For example, the storage device controller 300 may implement algorithms including garbage collection (GC), wear-levelling (WL), block reclaim (BR) and runtime bad block (RBB). Therefore, when any one algorithm of GC, WL, BR and RBB is executed, the storage device is required to move internal data.

When the storage device moves internal data or writes host data, the write performance is likely to be degraded or destabilized. When the storage device controller 300 moves a large amount of internal data, the operation may have an influence on the execution efficiency of the write command from the host 10, thereby degrading the write performance of the electronic device. On the other hand, when there are relatively few or no internal data movement requests to be processed by the storage device controller 300, the write performance is improved. In order to stabilize the write efficiency of the host data, an embodiment of a control method of the storage device is as follows.

Figure 3:
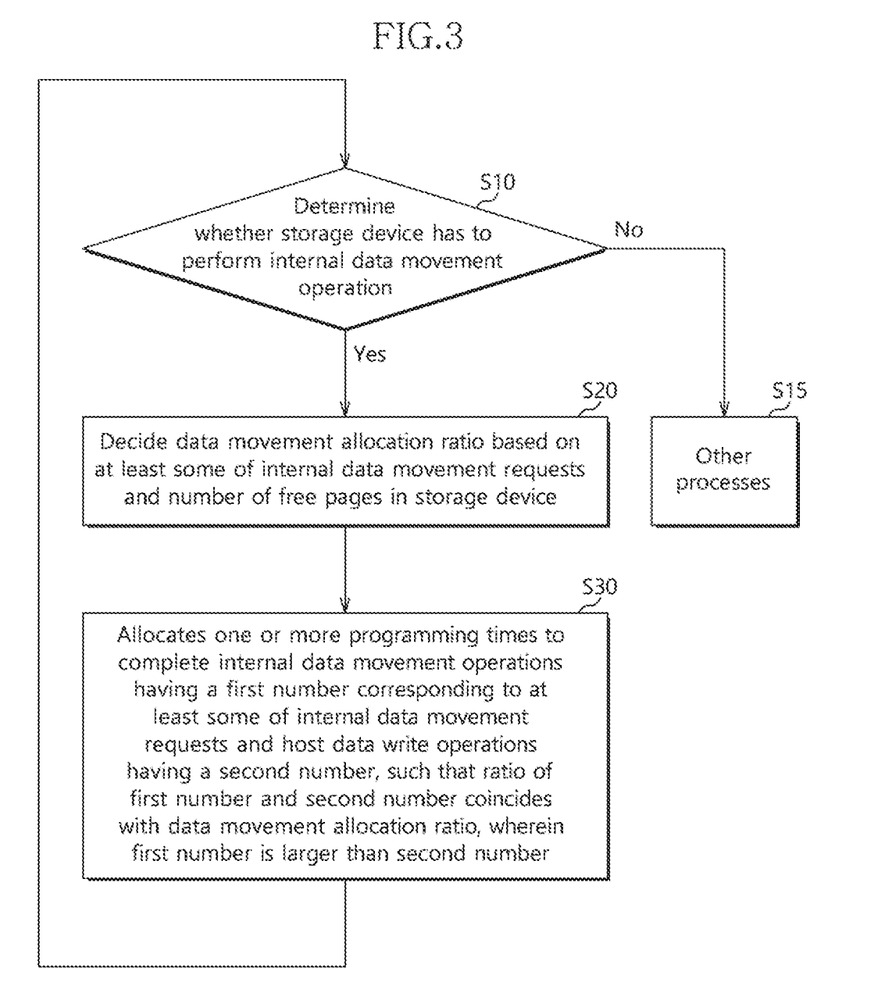
FIG. 3 is a flowchart illustrating a control method of a storage device in accordance with an embodiment of the present invention.

FIG. 3 is a flowchart of a control method of a storage device in accordance with an embodiment of the present invention. The embodiment illustrated in FIG. 3 may be applied to a device with a memory, and implement various methods capable of stabilizing write efficiency of host data when the storage device needs to perform a movement operation of internal data (or internal data movement operation). Referring to FIGS. 1 and 3, the control method of the storage device includes step S10 to S30.

In step S10, the storage device controller 100 determines whether the storage device has to perform the internal data movement operation. For example, the storage device controller 100 determines whether the storage device has to perform the internal data movement operation, according to a condition such as whether there is a movement request of internal data (or internal data movement request), whether the amount of internal data to be moved has reached a threshold value, or whether the priority of the internal data movement operation has reached a predetermined condition.

In step S20, when determining that the storage device has to perform the internal data movement operation, the storage device controller 100 determines a data movement allocation ratio based on at least some of internal data movement requests and the number of free pages in the storage device. For example, the data movement allocation ratio is a function based on some of the internal data movement requests and the number of free pages in the storage device.

In step S30, the storage device controller 100 allocates one or more programming times to complete internal data movement operations having a first number corresponding to at least some of the above-described internal data movement requests, and host data write operations having a second number, such that the ratio of the first number to the second number coincides with the data movement allocation ratio. The first number is greater than the second number.

In step S30, as the ratio of the first number to the second number is controlled to coincide with the data movement allocation ratio decided in step S20, free memory spaces of the memory 200 may be averagely allocated and used. Therefore, when the internal data movement operation and the host data write operation are executed, it is possible to reduce the possibility that the write performance will be destabilized, while stabilizing the write efficiency of the host data.

In the method of FIG. 3, when the determination result of step S10 is NO, other processes are performed in step S15. For example, in step S15, the storage device controller 100 may temporarily stop the method, not control the counts (or numbers) for the internal data movement operations and the host data write operations, or repeat step S10 after temporarily stopping the method. Furthermore, based on the data movement allocation ratio determined in step S20, the storage device controller 100 may repeat step S30 to execute internal data movement requests and host data write requests which are to be processed. The storage device controller 100 may start from step S10 to S20 to repeat the method of FIG. 3. However, the present embodiment is not limited to such examples.

Hereafter, steps S10 to S30 in FIG. 3 are described as follows.

Figure 4:
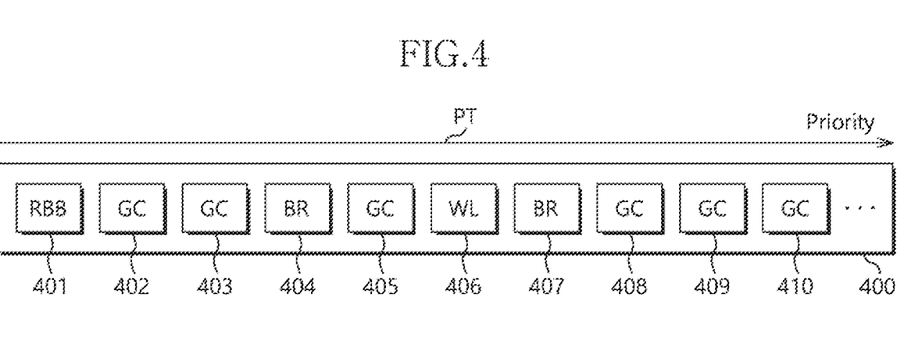
FIG. 4 is a diagram illustrating a data movement request sequence in accordance with an embodiment of the present invention.

In an embodiment, the storage device controller 100 may have a data movement request sequence. The data movement request sequence serves to include one or more internal data movement requests. Each of the internal data movement requests corresponds to a memory region whose internal data are to be moved, in the storage device. FIG. 4 is a diagram illustrating a data movement request sequence 400 in accordance with an embodiment of the present invention. In the data movement request sequence 400, blocks 401 to 410 may represent internal data movement requests in the data movement request sequence 400. In some cases, blocks 401 to 410 may represent memory regions in which data corresponding to the internal data movement requests are stored and/or of which data are to be moved. The internal data movement requests are generated by execution of any one algorithm of garbage collection (GC), wear-leveling (WL), block reclaim (BR) and runtime bad block (RBB). The blocks 401 to 410 may be implemented as nodes of the data movement request sequence 400. Each of the nodes may correspond to a memory region (for example, memory block) whose internal data are to be moved. For example, the block 401 may correspond to a memory region whose internal data are to be moved due to a runtime bad block. The blocks 402, 403, 405 and 408 to 410 correspond to memory regions whose internal data are to be moved due to GC. The blocks 404 and 407 correspond to memory regions whose internal data are to be moved due to BR. The block 406 may correspond to a memory region whose internal data are to be moved due to WL. After the internal data movement operations for the memory regions corresponding to the blocks 401 to 410 are performed, valid data of the memory regions corresponding to the blocks 401 to 410 may be moved to a new memory region. Thus, memory blocks or pages may be released for the subsequent use. Furthermore, the storage device controller 100 may apply different priorities to the stored internal data movement requests in descending order of priority, based on importance of the memory regions whose internal data are be moved. For example, in FIG. 4, an arrow PT indicates that a block closer to the left side in the data movement request sequence 400 has a higher priority, and a block closer to the right side in the data movement request sequence 400 has a lower priority. However, the priorities of the blocks, indicated by the direction of the arrow PT, are only an example for description, and the present embodiment is not limited to such an example.

In an embodiment, when it is determined in step S20 of FIG. 3 that the storage device has to perform the internal data movement operation, the storage device controller 100 determines the data movement allocation ratio according to at least some of the internal data movement requests in the data movement request sequence, the number of required free blocks and the number of free pages. For example, the data movement allocation ratio is a function based on at least some of the internal data movement requests of the data movement request sequence, the number of required free blocks and the number of free pages.

In an embodiment, the data movement allocation ratio in step S20 is decided according to at least some internal data movement requests with relatively high priorities in the data movement request sequence, the number of required free blocks and the number of free pages. As illustrated in FIG. 4, the internal data movement requests corresponding to the blocks 401, 402, and 403 in the data movement request sequence 400 are internal data movement requests with relatively high priories, which need to be preferentially processed. The memory regions (for example, memory blocks) corresponding to the internal data movement requests with relatively high priorities are likely to include valid pages. Therefore, the data movement allocation ratio may be set to a function based on the total number of valid pages for at least some internal data movement requests with relatively high priorities in the data movement request sequence, the number of required free blocks, and the number of free pages.

Figure 5:
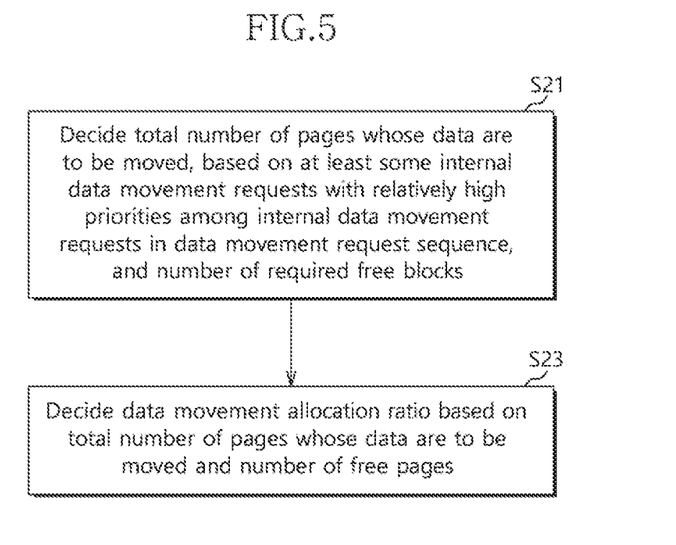
FIG. 5 is a flowchart illustrating step S20 of FIG. 3.

FIG. 5 is a flowchart illustrating step S20 in FIG. 3. As illustrated in FIG. 5, the embodiment of step S20 includes steps S21 and S23 as follows.

In step S21, when determining that the storage device has to perform the internal data movement operation, the storage device controller 100 decides the total number of pages whose data are to be moved, according to at least some internal data movement requests with relatively high priorities among the internal data movement requests in the data movement request sequence, and the number of required free blocks.

In step S23, the storage device controller 100 decides the data movement allocation ratio according to the total number of pages whose data are to be moved and the number of free pages.

For example, in step S21, the total number of pages whose data are to be moved is a function based on at least some internal data movement requests with relatively high priorities in the data movement request sequence, and the number of required free blocks. This function may be set and defined by Equation 1-1 and Equation 1-2.

$$IPC_1+IPC_2+\ldots+IPC_N \geq NrRequiredFreeBlocks*PagesPerBlock \quad \text{(Equation 1-1)}$$

$$TotalMovedPages=(N*PagesPerBlock)-(IPC_1+IPC_2+\ldots+IPC_N) \quad \text{(Equation 1-2)}$$

In Equations 1-1 and 1-2, NrRequiredFreeBlocks, PagesPerBlock and TotalMovedPages represent the number of required free blocks, the number of pages per memory region (i.e., memory block), and the total number of pages whose data are to be moved, respectively. The right side of Equation 1-1 is the number of pages corresponding to the number of required free blocks. The left side of Equation 1-1 is the sum of invalid page counts IPCi in memory regions corresponding to the internal data movement requests with relatively high priorities in the data movement request sequence, where i is an integer ranging from 1 to N. For example, referring to FIG. 4, the storage device controller 100 may select N internal data movement requests in the data movement request sequence 400, according to descending order of priority. Further, the storage device controller 100 may calculate the sum of invalid page counts IPCi in the memory regions corresponding to the N internal data movement requests. When the sum of the invalid page counts IPCi satisfies Equation 1-1, the value of N may be decided. Then, the storage device controller 100 may acquire the total number of pages whose data are to be moved, using Equation 1-2. For example, when the sum of the invalid page counts IPCi satisfies Equation 1-1, it indicates that the storage device controller 100 can perform the internal data movement operation on the memory regions corresponding to the N internal data movement requests, and then release a memory space of memory regions (for example, memory blocks) corresponding to the number of required free blocks (NrRequiredFreeBlocks).

For example, in step S23, the data movement allocation ratio represented by NrMoves may be set to a value obtained by dividing the total number of pages (TotalMovePages) whose data are to be moved by the number of free pages (NrFreePages), and expressed as Equation 2 below.

$$NrMoves=TotalMovePages/NrFreePages \quad \text{(Equation 2)}$$

Referring back to FIG. 3, in step S30, as the storage device controller 100 controls the ratio of the first number to the second number to coincide with the data movement allocation ratio decided in the embodiment of step S20 of FIG. 5, the free memory spaces of the memory 200 may be averagely allocated and used. Therefore, when the internal data movement operation and the host data write operation are performed, it is possible to reduce the possibility that the write performance will be destabilized, while stabilizing the write efficiency of the host data.

When the storage device is coupled to the host 10 and accesses data of the memory 200 through the storage device controller 100, the storage device controller 100 may update the data movement request sequence, the number of required free memory blocks and the number of free pages, depending on the actual operation. Therefore, the data movement allocation ratio which the storage device controller 100 acquires by executing the control method of the storage device in FIG. 3 may also be changed according to the operation of the storage device.

In some embodiments, the number of required free blocks is the number of memory regions which the storage device controller 100 intends to maintain according to the use of the plurality of memory regions corresponding to the memory 200. For example, the storage device controller 100 may decide the number of required free blocks, based on the performance condition, the number of free blocks remaining at the moment or other parameters, according to the operation of the storage device. For example, the storage device controller 100 may decide the number of free memory regions to be arranged (e.g. 100 or 50 blocks) or decide how many free blocks need to be left in the memory 200. In addition, the number of free pages is the number of free memory pages which can be used for a data write operation of the host 10 in the storage device.

Figure 6:
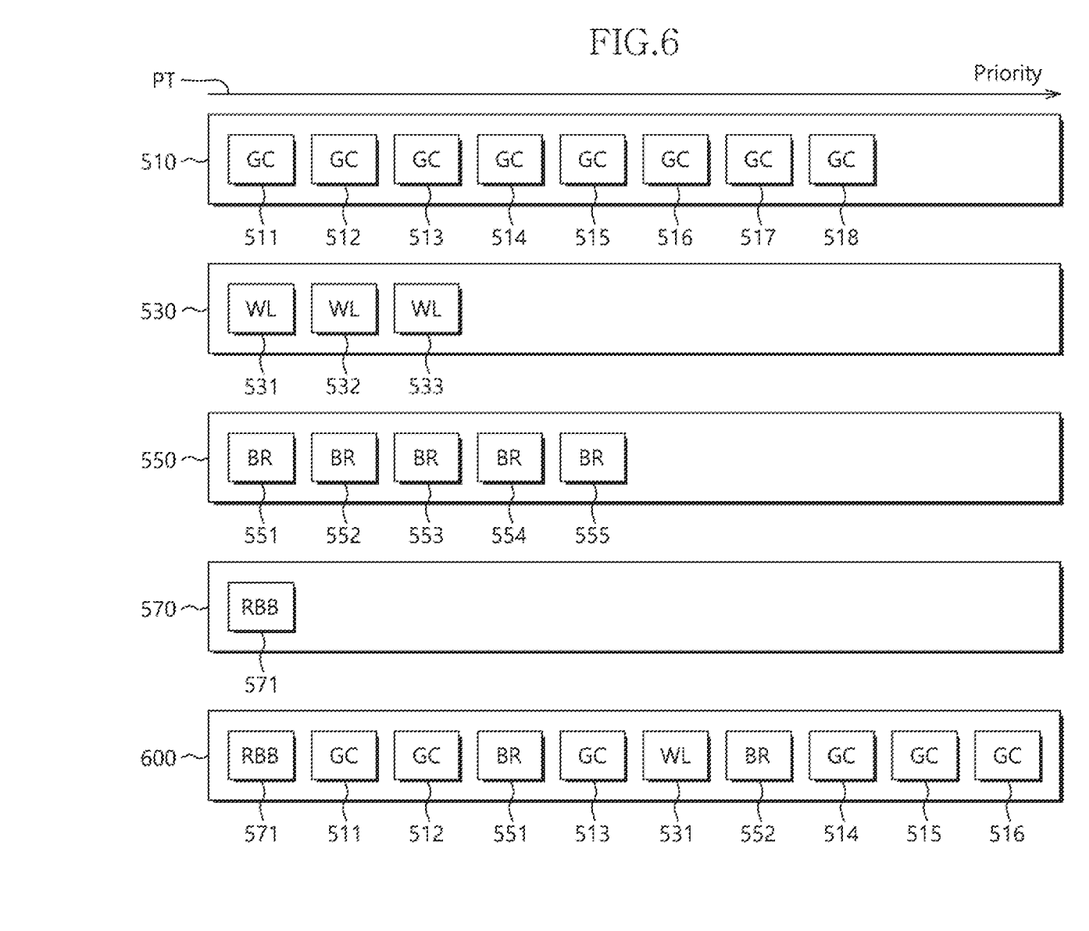
FIG. 6 is a diagram illustrating a data movement request sequence in accordance with an embodiment of the present invention.

In the above-described embodiment or other embodiments, the storage device controller 100 may directly store the internal data movement requests using the data movement request sequence 400 illustrated in FIG. 4, in order to implement the control method of FIG. 3. However, the present embodiment is not limited to such examples. In some other embodiments, the storage device controller 100 may implement the data movement request sequence using a method illustrated in FIG. 6, in order to implement the control method of FIG. 3. As illustrated in FIG. 6, the storage device controller 100 stores different types of internal data movement requests using a plurality of queues 510, 530, 550 and 570, and acquires a data movement request sequence 600 through the queues 510, 530, 550 and 570. The queue 530 serves to store internal data movement requests generated through WL. The queue 550 serves to store internal data movement requests generated through BR. The queue 570 serves to store internal data movement requests generated through RBB. In FIG. 6, blocks 511 to 518, 531 to 533, 551 to 555 and 571 correspond to internal data movement requests, and the data movement request sequence is generated by execution of any one algorithm of GC, WL, BR and RBB. The blocks 511 to 518, 531 to 533, 551 to 555 and 571 may be implemented as nodes of the queues 510, 530, 550 and 570. Each of the nodes may correspond to a memory region (for example, memory block) whose internal data need to be moved.

The storage device controller 100 may apply different priorities to the stored internal data movement requests in descending order of priority, based on the importance of the memory regions whose internal data are to be moved. For example, in FIG. 6, an arrow PT indicates that blocks closer to the left side in the queues 510, 530, 550 and 570 and the data movement request sequence 600 have a higher priority, and blocks closer to the right side in the queues 510, 530, 550 and 570 and the data movement request sequence 600 have a lower priority. However, the priorities of the blocks, indicated by the direction of the arrow PT, are only an example for description, and the present embodiment is not limited to such an example. The storage device controller 100 may apply different priorities to nodes in the queues by applying different policies or conditions based on classification of the queues.

In the case of the queue 510 related to GC, the storage device controller 100 applies priorities to the internal data movement requests according to the invalid page counts (IPCs) of the memory regions corresponding to the internal data movement requests. For example, as the corresponding IPC is higher or the corresponding valid page count is lower, the higher priority is applied.

In the queue 530 related to WL, the storage device controller 100 applies priorities to the internal data movement requests according to the erase counts of the memory regions corresponding to the internal data movement requests. For example, as the corresponding erase count is lower, the higher priority is applied.

In the queue 550 related to BR, the storage device controller 100 applies priorities to the internal data movement requests according to the read counts of the memory regions corresponding to the internal data movement requests. For example, as the corresponding read count is higher, the higher priority is applied.

In the case of the queue 570 related to RBB, bad memory pages are present in the memory regions corresponding to the internal data movement requests. Therefore, the storage device controller 100 does not need to set priorities.

The storage device controller 100 may apply priorities (or weights) to the queues 510, 530, 550 and 570, or separately calculate valid page counts for the memory regions. The storage device controller 100 may acquire the data movement request sequence 600 by selectively coupling and arranging the valid page counts as parameters, based on nodes with relatively high priorities in the queues 510, 530, 550 and 570. Thus, the storage device controller 100 may implement the control method of FIG. 3 using the data movement request sequence 600. In the present embodiment, the internal data movement requests and the priorities may be classified and processed in more detail. Therefore, the control method of FIG. 3 may preferentially process an internal data movement request which is important or helpful for the durability of the storage device.

In some embodiments, the queues illustrated in FIG. 6 may be merged, and any two or three queues of the queues 510, 530, 550 and 570 may be merged into one queue. For example, the queues 530 and 550 may be merged into one queue. In this case, it is possible to reduce the complexity of the queuing process.

Referring back to FIG. 3, in some embodiments of step S30, the storage device controller 100 may allocate one or more programming times using a parallel mode or non-parallel mode, and thus complete the first number of internal data movement operations corresponding to at least some of the above-described internal data movement requests and the second number of host data write operations.

The case in which a plurality of memory chips are included in the memory 200 of the storage device is illustrated in FIG. 1. In an embodiment, step S30 may include allocating, by the storage device controller 100, one or more programming times to complete the first number of internal data movement operations using a first number of memory chips in the storage device, and to complete the second number of host data write operations using a second number of memory chips in the storage device, according to the parallel mode. Therefore, the storage device controller 100 may control the ratio of the first number to the second number and the ratio of the first number of memory chips to the second number of memory chips to coincide with the data movement allocation ratio. The first number is greater than the second data number, and the first number of memory chips is greater than the second number of memory chips. For example, when the data movement allocation ratio is 3:1, four memory chips are included in the memory of the storage device and the parallel processing is possible. In the present embodiment, the storage device controller 100 allocates one or more programming times to complete the first number (for example, three pages) of internal data movement operation using the first number of memory chips (for example, three chips) in the storage device, and to complete the second number (for example, one page) of host data write operations using the second number of memory chips (for example, one chip) in the storage device, according to the parallel mode.

In an embodiment, the one or more programming times includes a first number of programming times and a second number of programming times. In some embodiments, step S30 includes allocating, by the storage device controller, the first number of programming times to complete the first number of internal data movement operations, and allocating the second number of programming times to complete the second number of host data write operations, according to the non-parallel mode, such that the ratio of the first number to the second number coincides with the data movement allocation ratio. The first number is greater than the second number, and the first number of programming times is greater than the second number of programming times. For example, when the data movement allocation ratio is 3:1, four memory chips are included in the memory of the storage device. In accordance with the present embodiment, the storage device controller 100 allocates the first number of programming times (for example, three programming times) to complete the first number (for example, 3*4=12 pages) of internal data movement operations using four memory chips. Furthermore, the storage device controller 100 allocates the second number of programming times (for example, one separate programming time) to complete the second number (for example, 1*4=4 pages) of host data write operations using four memory chips.

Figure 7:
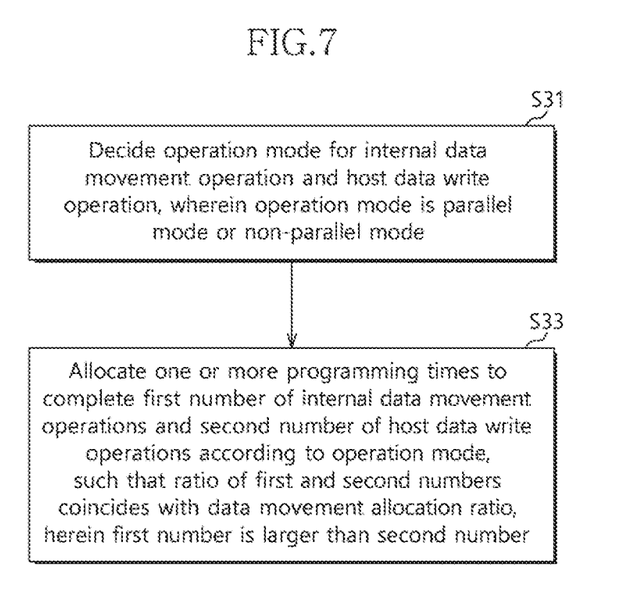
FIG. 7 is a flowchart illustrating step S30 of FIG. 3.

In another embodiment of step S30, the storage device controller 100 may decide an operation mode for the internal data movement operation and the host data write operation based on the arrangement of the memory chips of the storage device, estimated performance, or other parameters. Further, the storage device controller 100 may allocate one or more programming times to complete the first number of internal data movement operations corresponding to at least some of the above-described internal data movement requests and the second number of host data write operations. FIG. 7 is a flowchart illustrating step S30 in FIG. 3. As illustrated in FIG. 7, the step S30 includes steps S31 and S33, and the storage device includes the plurality of memory chips.

In step S31, the storage device controller decides an operation mode for the internal data movement operation and the host data write operation, and the operation mode is the parallel mode or non-parallel mode.

In step S33, the storage device controller allocates one or more programming times to complete the first number of internal data movement operations and the second number of host data write operations according to the operation mode, such that the ratio of the first and second numbers coincides with the data movement allocation ratio. The first number is greater than the second number.

In step S31, the storage device controller 100 may decide the operation mode for the internal data movement operation and the host data write operation, based on the arrangement of the memory chips of the storage device, the estimated performance or other parameters. When the data movement allocation ratio is 7:1 and eight memory chips are included in the memory of the storage device, the storage device controller may decide the operation mode as the parallel mode. Thus, in corresponding step S33, the above-described embodiment related to the parallel mode may be applied. The storage device controller 100 may allocate one programming time to complete a first number (for example, seven pages) of internal data movement operations using a first number (for example, 7) of memory chips in the storage device and to complete a second number (for example, one page) of host data write operations using a second number (for example, 1) of memory chips in the storage device, according to the parallel mode.

When the data movement allocation ratio is 7:1 and four memory chips are included in the memory of the storage device, the storage device controller may determine the operation mode is the non-parallel mode, Thus, in corresponding step S33, the above-described embodiment related to the non-parallel mode may be applied. The storage device controller 100 may allocate a first number of programming times (for example, seven programming times) to complete a first number (for example, 7*4=28 pages) of internal data movement operations using the four memory chips, and allocate a second number of programming times (for example, one separate programming time) to complete a second number (for example, 1*4=4 pages) of host data write operations using the four memory chips.

In step S31, the storage device controller 100 may decide the operation mode for the internal data movement operation and the host data write operation according to the estimated performance. For example, when estimating the current numbers of internal data movement requests and host data write requests, the storage device controller 100 decides the operation mode as the non-parallel mode (or parallel mode) when processing efficiency acquired through the non-parallel mode (or parallel mode) is relatively satisfactory.

In step S31, the storage device controller may decide the operation mode for the internal data movement operation and the host data write operation, based on the arrangement of the memory chips of the storage device, the estimated performance or other parameters.

In an embodiment related to step S30, the order in which the internal data movement operation and the host data write operation are performed is not limited during one or more allocated programming times. In other words, as long as the ratio of the first number to the second number coincides with the data movement allocation ratio during the one or more allocated programming times, the internal data movement operation and the host data write operation may be intermittently or simultaneously completed according to a random executable order.

In some embodiments, a computing device (for example, the storage device illustrated in FIG. 1 or 2) includes a non-transient storage medium which stores a program code for controlling the storage device controller of the storage device to execute the control method of the storage device. The method includes any one of embodiments of the method of FIG. 3 or combinations thereof. For example, the program code may include one or more programs or program modules for implementing steps S10 to S30 of FIG. 3, steps S21 and S23 of FIG. 5 or steps S31 and S33 of FIG. 7, and the program codes of such modules may be operated in cooperation, and executed in a proper order or in parallel. When the computing device executes such program codes, the computing device may execute any one embodiment of the control method of the storage device in FIG. 3. Examples of the readable recording medium may include firmware, read only memory (ROM), random access memory (RAM), memory card, optical information storage medium, magnetic information storage medium or other random types of storage media or memories, and the present embodiment is not limited to such examples.

In the embodiment (FIGS. 1 and 2) related to the storage device, one or more of the processor 110, the memory channel controller 140 and the host interface 150 or combinations thereof may be implemented with one or more circuits. For example, the one or more of the processor 110, the memory channel controller 140 and the host interface 150 or the combinations thereof may be implemented with one or more of a processor, a digital signal processor, a microprocessor, a programmable integrated circuit such as a field programmable gate array (FPGA) and an application specific integrated circuit (ASIC)-type circuit, or implemented with dedicated circuits or modules. The memory channel controller may also be implemented as software such as a process, thread or program module or other types of software. However, the present embodiment is not limited to such examples.

Therefore, the embodiments can be applied to a device with a memory, and provide a storage device, a control method of a storage device and a storage medium for implementing various methods capable of stabilizing data write efficiency of the host when the storage device moves internal data. For example, the storage device may allocate one or more programming times to complete the internal data movement operation and the host data write operation, and control the count ratio of the internal data movement operation and the host data write operation. Thus, when the storage device performs the internal data movement operation, the influence on the destabilization of the host data write efficiency may be reduced.

In accordance with the present embodiments, it is possible to provide a storage device and a control method thereof which can be applied to a device with a memory and implement various methods capable of stabilizing data write efficiency of the host, when performing the internal data movement operation. For example, the storage device controller can allocate one or more programming times to complete the internal data movement operation and the host data write operation, and thus control the ratio of the number of the internal data movement operations to the number of the host data write operations, thereby reducing the influence on the destabilization of the host data write efficiency when the storage device moves internal data.

While various embodiments have been described above, it will be understood to those skilled in the art that the embodiments described are examples only. Accordingly, the storage device and the control method thereof, which have been described herein, should not be limited based on the described embodiments.

What is claimed is:

1. A control method of a storage device, comprising:
   determining, by a storage device controller, whether the storage device has to move internal data;
   deciding, by the storage device controller, a data movement allocation ratio based on at least some of internal data movement requests and the number of free pages in the storage device, when it is determined that the storage device has to move internal data; and
   allocating, by the storage device controller, one or more programming times to complete a first number of internal data movement operations corresponding to the at least some of the internal data movement requests and a second number of host data write operations, such that the ratio of the first number to the second number coincides with the data movement allocation ratio, wherein the first number is greater than the second number.

2. The control method according to claim 1, wherein the storage device controller has a data movement request sequence for storing the internal data movement requests, each of the internal data movement requests corresponding to a memory region whose internal data are to be moved in the storage device, and wherein the memory region is a memory region where garbage collection, wear-levelling, block reclaim or runtime bad block is to be performed.

3. The control method according to claim 1, wherein the storage device controller has a data movement request sequence for storing the internal data movement requests, and each of the internal data movement requests corresponds to a memory region whose internal data are to be moved in the storage device, and
   wherein, when it is determined that the storage device has to move the internal data, the storage device controller decides the data movement allocation ratio based on at least some of the internal data movement requests in the data movement request sequence, the number of required free blocks, and the number of free pages.

4. The control method according to claim 3, wherein the at least some internal data movement requests include internal data movement requests with relatively high priorities in the data movement request sequence.

5. The control method according to claim 1, wherein the storage device controller has a data movement request sequence for storing the internal data movement requests, and each of the internal data movement requests corresponds to a memory region whose internal data are to be moved in the storage device,
   wherein the deciding of the data movement allocation ratio comprises:
   deciding, by the storage device controller, a total number of pages whose data are to be moved, based on at least some internal data movement requests with relatively high priorities among the internal data movement requests in the data movement request sequence, and the number of required free blocks; and
   deciding the data movement allocation ratio based on the total number of pages whose data are to be moved and the number of free pages.

6. The control method according to claim 1, wherein the storage device comprises a plurality of memory chips,
   wherein the allocating of the one or more programming times comprises allocating, by the storage device controller, the one or more programming times to complete the first number of internal data movement operations using a first number of memory chips in the storage device and to complete the second number of host data write operations using a second number of memory chips in the storage device, according to a parallel mode, such that the ratio of the first number to the second number and the ratio of the first number of memory chips to the second number of memory chips coincide with the data movement allocation ratio, wherein the first number is greater than the second number, and the first number of memory chips is greater than the second number of memory chips.

7. The control method according to claim 1, wherein the one or more programming times comprise a first number of programming times and a second number of programming times,
   wherein the allocating of the one or more programming times comprises allocating, by the storage device controller, the first number of programming times to complete the first number of internal data movement operations, and allocating the second number of programming times to complete the second number of host data write operations, such that the ratio of the first number to the second number coincides with the data movement allocation ratio, wherein the first number is greater than the second number, and the first number of programming times is greater than the second number of programming times.

8. The control method according to claim 1, wherein the storage device comprises a plurality of memory chips,
   wherein the allocating of the one or more programming times comprises:
   deciding, by the storage device controller, an operation mode for the internal data movement operation and the host data write operation, wherein the operation mode is one of a parallel mode and a non-parallel mode; and
   allocating the one or more programming times to complete the first number of internal data movement operations and the second number of host data write operations in the operation mode, such that the ratio of the first number to the second number coincides with the data movement allocation ratio, wherein the first number is greater than the second number.

9. A non-transitory computer-readable storage medium that stores program code for controlling a storage device, the program code which when executed by a processor, causes the storage device to perform operations comprising:
   determining, by a storage device controller, whether the storage device has to move internal data;
   deciding, by the storage device controller, a data movement allocation ratio based on at least some of internal data movement requests and the number of free pages in the storage device, when it is determined that the storage device has to move internal data; and
   allocating, by the storage device controller, one or more programming times to complete a first number of internal data movement operations corresponding to the at least some of the internal data movement requests and a second number of host data write operations, such that the ratio of the first number to the second number coincides with the data movement allocation ratio, wherein the first number is greater than the second number.

10. A storage device comprising:
    a memory; and
    a storage device controller coupled to the memory, and configured to control the memory to perform data access to the memory,
    wherein the storage device controller determines whether the storage device has to move internal data; decides a data movement allocation ratio based on at least some of internal data movement requests and the number of free pages in the storage device, when it is determined that the storage device has to move internal data; and allocates one or more programming times to complete a first number of internal data movement operations corresponding to at least some of the internal data movement requests and a second number of host data write operations, such that the ratio of the first number to the second number coincides with the data movement allocation ratio, wherein the first number is greater than the second number.

11. The storage device according to claim 10, wherein the storage device controller has a data movement request sequence for storing the internal data movement requests, each of the internal data movement requests corresponding to a memory region whose internal data are to be moved in the storage device, and wherein the memory region whose internal data are to be moved, is a memory region where garbage collection, wear-levelling, block reclaim or runtime bad block is performed.

12. The storage device according to claim 10, wherein the storage device controller has a data movement request sequence for storing the internal data movement requests, and each of the internal data movement requests corresponds to a memory region whose internal data are to be moved in the storage device, and
    wherein, when determining that the storage device has to move internal data, the storage device controller decides the data movement allocation ratio based on at least some of the internal data movement requests in the data movement request sequence, the number of required free blocks and the number of free pages.

13. The storage device according to claim 12, wherein the at least some internal data movement requests include internal data movement requests with high priorities in the data movement request sequence.

14. The storage device according to claim 10, wherein the storage device controller has a data movement request sequence for storing the internal data movement requests, and each of the internal data movement requests corresponds to a memory region whose internal data are to be moved in the storage device,
    wherein, when determining that the storage device has to move internal data, the storage device controller decides a total number of pages whose data are to be moved, based on at least some internal data movement requests with high priorities among the internal data movement requests in the data movement request sequence and the number of required free blocks, and decides the data movement allocation ratio based on the total number of pages whose data are to be moved and the number of free pages.

15. The storage device according to claim 10, wherein the memory comprises a plurality of memory chips, and the storage device controller allocates the one or more programming times to complete the first number of internal data movement operations using a first number of memory chips in the storage device and to complete the second number of host data write operations using a second number of memory chips in the storage device, according to a parallel mode, such that the ratio of the first number to the second numbers and the ratio of the first number of memory chips to the second number of memory chips coincide with the data movement allocation ratio, wherein the first number is greater than the second number, and the first number of memory chips is greater than the second number of memory chips.

16. The storage device according to claim 10, wherein the one or more programming times comprise a first number of programming times and a second number of programming times, and the storage device controller allocates the first number of programming times to complete the first number of internal data movement operations, and allocates the second number of programming times to complete the second number of host data write operations, such that the ratio of the first number to the second number coincides with the data movement allocation ratio, wherein the first number is greater than the second number, and the first number of programming times is greater than the second number of programming times.

17. The storage device according to claim 10, wherein the memory comprises a plurality of memory chips, and the storage device controller decides an operation mode for the internal data movement operation and the host data write operation, which is a parallel mode or a non-parallel mode, and allocates the one or more programming times to complete the first number of internal data movement operations and the second number of host data write operations according to the operation mode, such that the ratio of the first number to the second number coincides with the data movement allocation ratio, wherein the first number is greater than the second number.

18. A storage device comprising:
   a memory including a plurality of blocks, each block including a plurality of pages; and
   a controller coupled to the memory, suitable for:
   determining the number of data moves based on the number of target pages whose data are to be moved between at least two blocks among the plurality of blocks and the number of free pages for write data from a host;
   determining a programming time for the write data and data movement times for data moves based on the number of data moves; and
   performing a data movement for the number of target pages based on the data movement times.

* * * * *